United States Patent
Wang et al.

(10) Patent No.: US 7,428,339 B2
(45) Date of Patent: Sep. 23, 2008

(54) PSEUDO-FRAMES FOR MPEG-2 ENCODING

(75) Inventors: Xingguo Wang, Fremont, CA (US);
Guobin Chen, Hangzhou (CN);
Lingxiang Zhou, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 858 days.

(21) Appl. No.: 10/703,847

(22) Filed: Nov. 7, 2003

(65) Prior Publication Data

US 2005/0100231 A1    May 12, 2005

(51) Int. Cl.
*G06K 9/36* (2006.01)
(52) U.S. Cl. ................ 382/236; 382/232; 382/238
(58) Field of Classification Search ......... 382/232, 382/233, 236, 238, 245, 246, 250, 239; 709/215, 709/247; 365/189.04; 345/603, 530, 502, 345/630; 708/401, 402, 400; 375/240.25, 375/240.12, 240.07
See application file for complete search history.

(56) References Cited

U.S. PATENT DOCUMENTS

| | | | | |
|---|---|---|---|---|
| 5,386,233 A | * | 1/1995 | Keith | 375/240.07 |
| 5,446,839 A | * | 8/1995 | Dea et al. | 345/502 |
| 5,684,534 A | * | 11/1997 | Harney et al. | 375/240.25 |
| 5,761,423 A | * | 6/1998 | Lee | 709/215 |
| 5,995,080 A | * | 11/1999 | Biro et al. | 345/603 |
| 6,026,217 A | * | 2/2000 | Adiletta | 709/247 |
| 6,101,276 A | * | 8/2000 | Adiletta et al. | 382/236 |
| 6,292,589 B1 | * | 9/2001 | Chow et al. | 382/239 |
| 6,295,546 B1 | * | 9/2001 | Adiletta | 708/402 |
| 6,760,478 B1 | * | 7/2004 | Adiletta et al. | 382/236 |

FOREIGN PATENT DOCUMENTS

EP         0755157 A2  *  1/1997
JP    408251582 A  *  9/1996

* cited by examiner

*Primary Examiner*—Anh Hong Do
(74) *Attorney, Agent, or Firm*—Patent Law Group LLP; David C. Hsia

(57) ABSTRACT

A method for real-time video encoding includes buffering frames in an encoder input buffer, retrieving the frames from the encoder input buffer, encoding the retrieved frames into a bit stream, monitoring the encoder input buffer for buffer overflow, and, if the encoder input buffer is about to overflow, encoding one of the retrieved frames as a pseudo-frame that completely references one reference frame of the one retrieved frame. Encoding one of the retrieved frames as a pseudo-frame bypasses a majority of the encoding procedures to improve the overall encoding speed. The method further includes monitoring a hypothetical decoder input buffer that models an actual decoder input buffer in a video decoder, encoding one of the retrieved frames with a pseudo-frame if the hypothetical decoder input buffer is about to underflow, and adding stuffing bits to the bit stream if the hypothetical decoder input buffer is about to overflow.

21 Claims, 4 Drawing Sheets

Display order: I1, B1, B2, B3, P1, B4, B5, B6, B7, B8, P2, I2 ...
Encoding order: I1, P1, B1, B2, B3, P2, B4, B5, B6, B7, B8, I2 ...

ized into a bit stream that complies with the MPEG-1 or the MPEG-2 standards. The bit stream is transported over a fixed-rate channel 16 to a MPEG video decoder 18. Video decoder 18 converts the bit stream into frames that are outputted to a display 20.

PSEUDO-FRAMES FOR MPEG-2 ENCODING

FIELD OF INVENTION

This invention relates to real-time video encoding, and more particularly to systems and methods for MPEG-1 and MPEG-2 video applications.

DESCRIPTION OF RELATED ART

FIG. 1 illustrates a conventional MPEG system. A video data source 12 outputs a video sequence to a MPEG video encoder 14. Video encoder 14 converts frame by frame of the video sequence, which are each segmented into 16 by 16 arrays of pixel data called macroblocks, into a bit stream that complies with the MPEG-1 or the MPEG-2 standards. The bit stream is transported over a fixed-rate channel 16 to a MPEG video decoder 18. Video decoder 18 converts the bit stream into frames that are outputted to a display 20.

Video encoder 14 includes an encoder input buffer 22 that stores the frames until they are processed. There are two modes in video coding: non-prediction ("intra") mode and prediction ("inter") mode. In intra mode, the macroblocks in the frame being coded are not compared with macroblocks in the reference frames but are otherwise similarly processed as inter coding as described herein. A frame coded in intra mode is referred to as an I-frame and serves as a reference frame in a group of pictures (GOP) for coding other frames in the GOP using motion predication and compensation. In constant GOP encoding, a frame is selected to be coded as an I-frame for a GOP based on a fixed GOP length. In variable GOP encoding, a frame is selected to be coded as an I-frame if that frame cannot be effectively coded with motion estimation and compensation.

In inter mode, a subtractor 24 compares the macroblocks in the frame being coded to the macroblocks in one reference frame in forward coding (or two reference frames in bidirectional coding). When a match is found, a motion predictor 26 generates a motion vector that specifies the location in the reference frame of the macroblock to be used for motion compensation. The residual block formed by subtracting the predicting macroblock (or the original macroblock when a match is not found) is then passed to a discrete cosine transform (DCT) coder 28 and later to a quantization coder 30 to generate a coded block pattern, quantized AC coefficients, and a quantized DC coefficient. DCT coder 28 is used to exploit spatial redundancies while quantization coder 30 is used to exploit psycho-visual redundancies.

A prediction encoder 32 predicatively codes the motion vectors generated by motion predictor 26 and the DC coefficient generated by quantization coder 30. A variable-length coder (VLC) 34 then codes the coded block pattern, the motion vectors, and the quantized AC and DC coefficients into a compliant bit stream. An encoder output buffer 36 stores the bit stream until they are transmitted over channel 16. A frame coded in inter mode is referred to as a predicated frame (P-frame) when it is coded from one reference frame, or a bidirectional frame (B-frame) when it is coded from two reference frames.

A rate controller 38 monitors the fullness of encoder output buffer 36 to meet the target bit rate requirement for a VBR (variable bit rate) or a CBR (constant bit rate) bit stream. According to the fullness of encoder output buffer 36 and the target bit rate, rate controller 38 adjusts the quantization scale factor (MQuant) of quantization coder 30.

At the same time, rate controller 38 also monitors the fullness of a video buffering verifier (VBV) buffer 39, which is a hypothetical decoder input buffer that models the actual decoder input buffer 40 in video decoder 18, to prevent buffer underflow or overflow. VBV buffer 39 and decoder input buffer 40 can underflow when fixed-rate channel 16 fills the buffer slower than the buffer is emptied by decoding the complaint bit stream. This happens when one or more consecutive large frames are not fully loaded into decoder input buffer 40 before they are to be decoded at the fixed rate prescribed by the MPEG standard. Decoder input buffer 40 can overflow when fixed-rate channel 16 fills the buffer faster than the buffer is emptied by decoding the complaint bit stream. This happens when too many small consecutive frames are loaded in to decoder input buffer 40 before they are decoded at the fixed rate prescribed by the MPEG standard. According to the fullness of encoder output buffer 36 and the VBV buffer, rate controller 38 adjusts the quantization step of quantization coder 30.

The design of video encoder 14 must balance video quality, bit-rate, and processing complexity. Video encoder 14 may need to skip frames during encoding in real-time encoding applications and while implementing bit-rate control. However, MPEG-2 syntax does not support variable frame rates. Thus, what is needed is a simple and efficient method for skipping frames while generating a compliant bit stream.

BRIEF DESCRIPTION OF THE DRAWINGS

Use of the same reference numbers in different figures indicates similar or identical elements.

SUMMARY

In one embodiment of the invention, a method for real-time video encoding includes buffering frames in an encoder input buffer, retrieving the frames from the encoder input buffer, encoding the retrieved frames into a bit stream, monitoring the encoder input buffer for buffer overflow, and, if the encoder input buffer is about to overflow, encoding one of the retrieved frames as a pseudo-frame that completely references one reference frame of the one retrieved frame. Encoding one of the retrieved frames as a pseudo-frame bypasses a majority of the encoding procedures to improve the overall encoding speed. The method further includes monitoring a hypothetical decoder input buffer that models an actual decoder input buffer in a video decoder, encoding one of the retrieved frames with a pseudo-frame if the hypothetical decoder input buffer is about to underflow, and adding stuffing bits to the bit stream if the hypothetical decoder input buffer is about to overflow.

DETAILED DESCRIPTION

In accordance with the invention, a method is provided to simulate frame skipping in MPEG-1 and MPEG-2 coding by encoding a P-frame or a B-frame as a pseudo-frame that completely references one reference frame of the frame being replaced. This method can be used to improve encoding speed in real-time video applications having limited hardware resources. In addition, this method can also handle VBV buffer overflow and underflow for bit-rate control. Overall, this method provides a smooth video even when the scenes change frequently and the processing power is limited.

Figure 2:
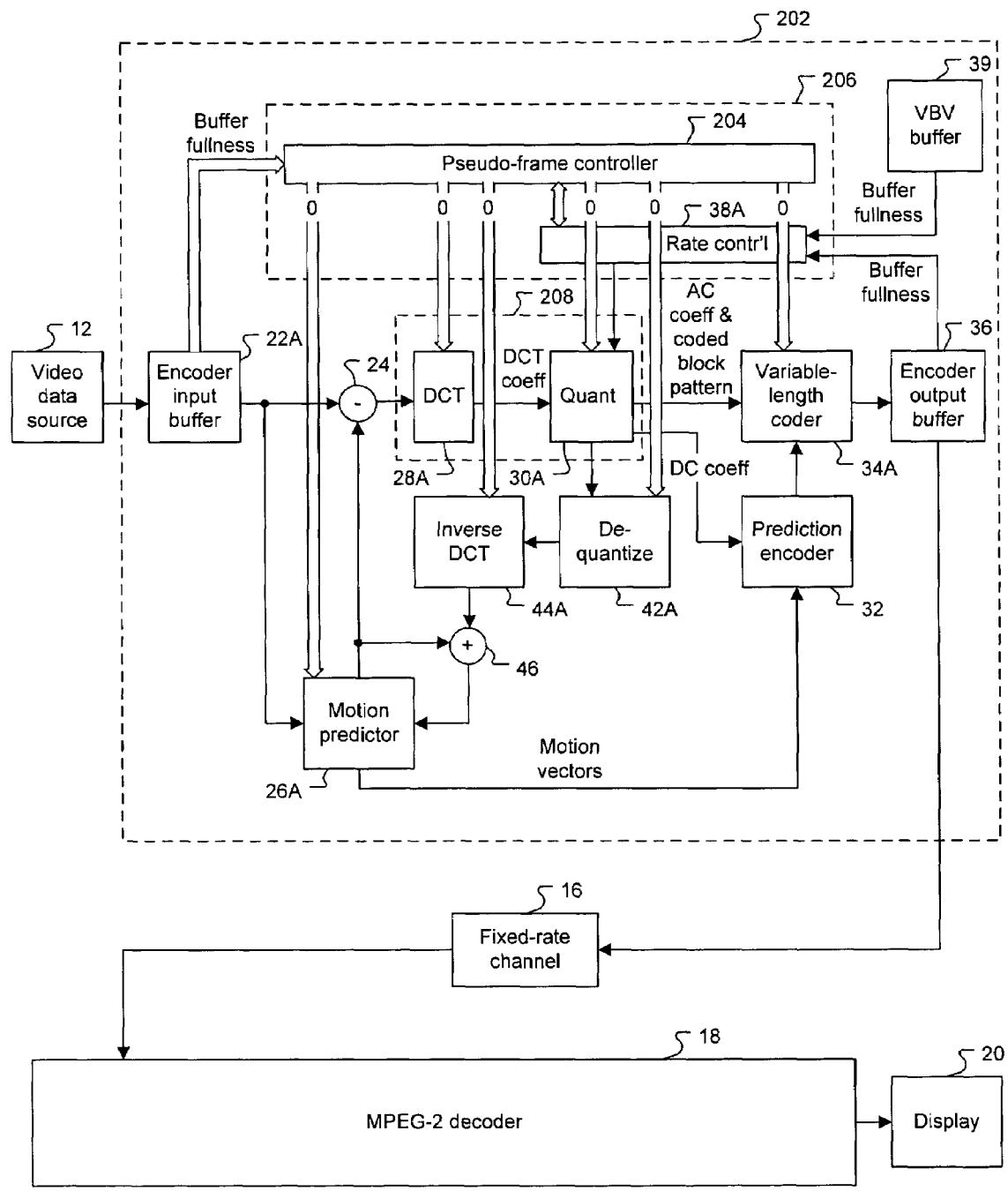
FIG. 2 illustrates a MPEG encoder with pseudo-frame control in one embodiment of the invention.

FIG. 2 illustrates a video encoder 202 with pseudo-frame control in one embodiment of the invention. Encoder 202 includes a pseudo-frame controller 204 that communicates with encoder input buffer 22A, motion predictor 26A, DCT coder 28A, quantization coder 30A, VLC 34A, rate controller 38A, de-quantization coder 42A, and inverse DCT coder 44A. Typically, the motion predictor is also referred to as a temporal coder and the DCT and quantization coders are collectively referred to as a spatial coder (e.g., spatial coder 208).

When encoder input buffer 22A is about to overflow, pseudo-frame controller 204 can encode a P-frame or a B-frame into a pseudo-frame by instructing these coders to bypass their operations and/or set their outputs to zeroes for the frame being coded. Rate controller 38A monitors the fullness of VBV buffer 39 and informs pseudo-frame controller 204 when VBV buffer 39 is about to underflow or overflow. When VBV buffer 39 is about to underflow, pseudo-frame controller 204 instructs a pseudo-frame to be encoded in the bit stream. When VBV buffer 39 is about to overflow, pseudo-frame controller 204 can instruct VLC 34A to add stuffing bits before a pseudo-frame in the bit stream. Although shown as two individual controllers, pseudo-frame controller 204 and rate controller 38A can be implemented as a single controller 206.

Figure 3:
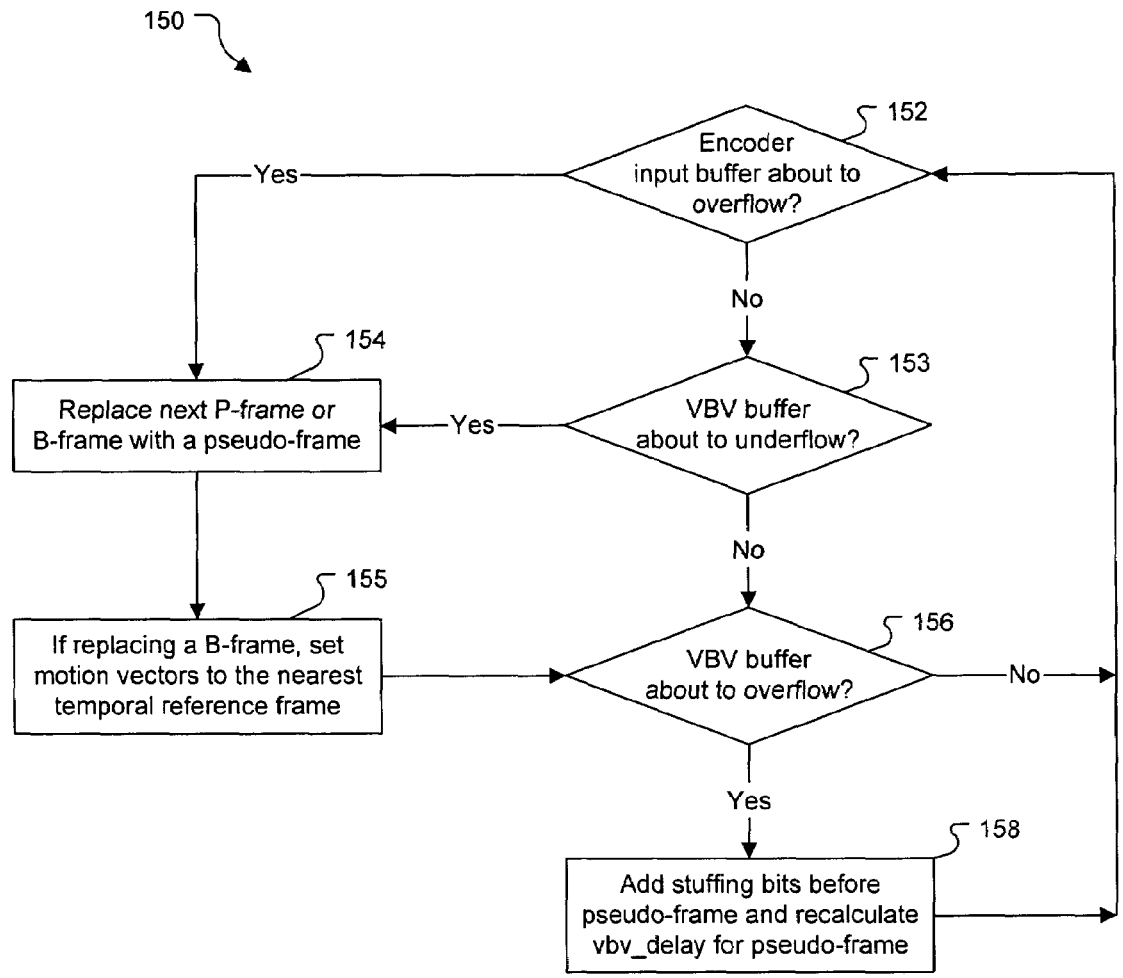
FIG. 3 illustrates a method for implementing the pseudo-frame control in one embodiment of the invention.

FIG. 3 illustrates a method 150 for video encoder 202 to simulate frame skipping in MPEG-2 coding using pseudo-frames in one embodiment of the invention. In step 152, pseudo-frame controller 204 (FIG. 2) monitors the fullness of encoder input buffer 22 (FIG. 2) to prevent buffer overflow during real-time encoding. Encoder input buffer 22 can overflow when the encoding speed cannot catch up with the rate of the incoming source frames. If encoder input buffer 22 is about to overflow, then step 152 is followed by step 154. Otherwise step 152 is followed by step 153. Encoder input buffer 22 is defined as "about to overflow" when its fullness is over a predetermined percentage of the size of the encoder input buffer 22. Alternatively, the encoder input buffer 22 is defined as about the overflow when a delay between when a frame is stored and when the frame is coded is greater than a predetermined time.

In step 153, rate controller 38A (FIG. 2) monitors the fullness of VBV buffer 39 to prevent decoder input buffer underflow. Rate controller 38A must inform pseudo-frame controller 204 when VBV buffer 39 is about to underflow. When VBV buffer 39 is about to underflow, then step 153 is followed by step 154. Otherwise step 153 is followed by step 156. VBV buffer 39 is defined as "about to underflow" when its fullness is below a predetermined percentage of the size of VBV buffer 39. The predetermined percentage is based on the size of VBV buffer 39. Alternatively, VBV buffer 39 is defined as "about to underflow" when parameter vbv_delay, which is defined by the MPEG-2 standard as the delay between storing a frame start code in the VBV buffer and starting the decoding of that frame, is greater than a time prescribed by the MPEG-2 standard.

Figure 1:
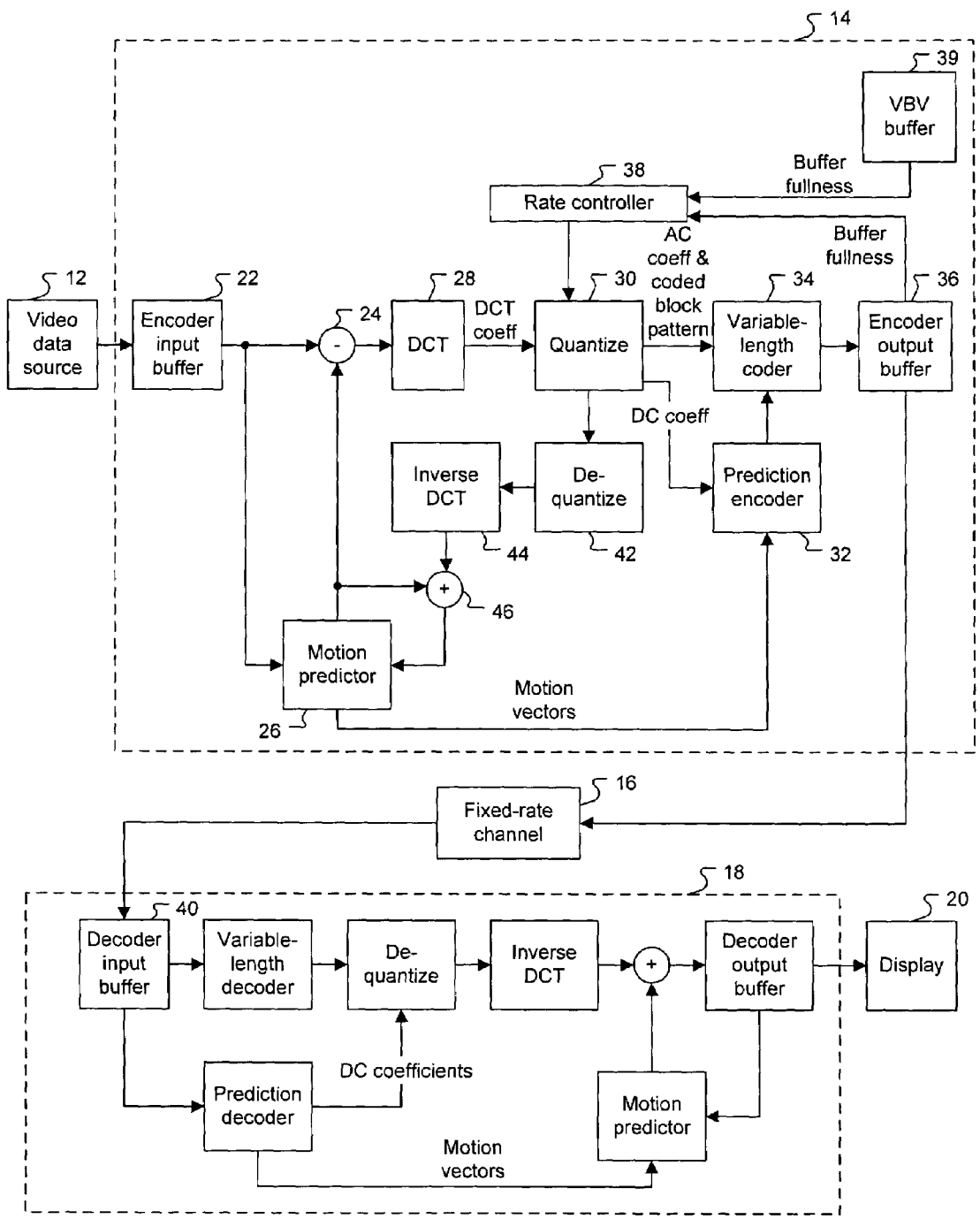
FIG. 1 illustrates a conventional MPEG encoder and a conventional MPEG decoder.

As described above, a conventional rate controller (e.g., rate controller 38 in FIG. 1) is able to handles VBV buffer underflow by adjusting the quantization step. However, the conventional rate controller does not balance the frame rate and the picture quality. On the other hand, pseudo-frame controller 204, in conjunction with rate controller 38A, can balance the frame rate and the picture quality by improving subsequent picture quality at the cost of actual frame rate. With the pseudo-frame mechanism, rate controller 38A can be programmed to provide a minimum picture quality by setting a maximum quantization step (e.g., 20). Thus, rate controller 38A can adjust the quantization step up to the maximum quantization step to prevent VBV buffer underflow. When rate controller 38A cannot prevent VBV buffer underflow under this condition, pseudo-frame controller 204 takes over and uses the pseudo-frame mechanism to prevent VBV buffer underflow.

In step 154, pseudo-frame controller 204 encodes the next P-frame or B-frame in the video as a pseudo-frame that simulates a skipped frame. The pseudo-frame is a frame with DCT coefficients, motions vectors, coded block pattern, and quantized AC and DC coefficients set to zeroes so when it is decoded it appears exactly like its reference frame. Note that pseudo-frame controller 204 does not encode the next I-frame in the video as a pseudo-frame because the I-frame does not have a reference frame.

Referring to FIG. 2, pseudo-frame controller 204 encodes the next P-frame or B-frame as a pseudo-frame by (1) instructing DCT coder 28A to skip its operations and to set the DCT coefficients to zeroes, (2) instructing quantization coder 30A to skip its operations and to set the coded block pattern and the AC and DC coefficients to zeroes, and (3) instructing motion predictor 26A to skip its operations and set the motion vectors to zeroes. Furthermore, controller 204 also (1) instructs de-quantization coder 42A to skip its operations and to set its output to zeroes, and (2) instructs inverse DCT coder 44A to skip its operations and to set its output to zeroes.

The coding of the pseudo-frame takes very little computational power because motion estimation, motion compensation, DCT, inverse DCT, quantization, and inverse quantization for the pseudo-frame are bypassed, and the complexity of the variable-length coding is reduced. Furthermore, the resulting coded pseudo-frame takes up very few bits in the bit stream. If the pseudo frame (skipped frame) appears occasionally with low possibility in the coded bit stream, the degradation is not perceivable by the human eyes in the video playback.

Encoding speed is especially improved when a B-frame is replaced with a pseudo-frame because the complex procedures of bidirectional prediction are bypassed for the pseudo B-frame as the encoder only needs to set the prediction from the nearest temporal reference instead of two temporal references. Furthermore, a pseudo B-frame degrades the video quality less than a pseudo P-frame because the B-frame (and thus the pseudo B-frame) is never used as a reference frame.

In step 154, pseudo-frame controller 204 also informs rate controller 38A that it is creating a pseudo-frame and the type of pseudo-frame (e.g., a pseudo P-frame or a pseudo B-frame). This allows rate controller 38A to take advantage of the bits freed up in the bit stream by the use of the pseudo-frame and improve the quality of subsequent frames by adjusting the quantization step.

As the pseudo-frame maintains the frame rate and takes up very few bits in the bit stream, it can cause the decoder input buffer to overflow when the pseudo-frame fills the buffer faster than the buffer is emptied by decoding the bit stream. Thus, as described later in step 156, rate controller 38A also monitors the VBV buffer and informs pseudo-frame controller 204 when the VBV buffer is about to overflow. Step 154 is followed by step 155.

Figure 4:
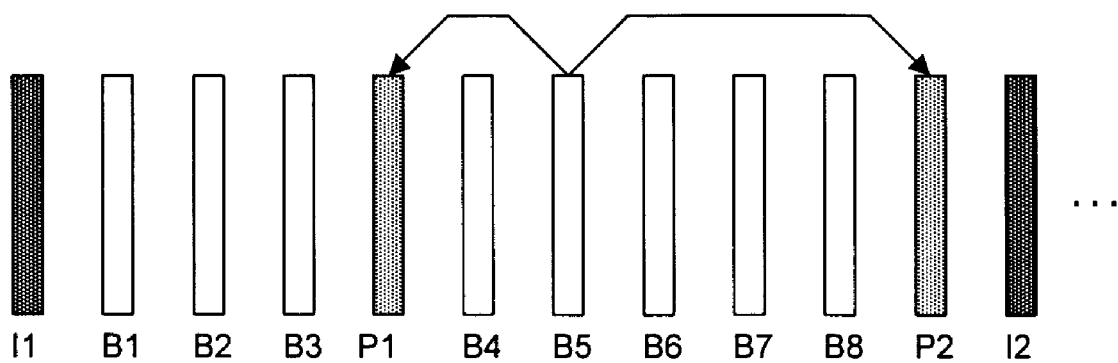
FIG. 4 illustrates video frames generated in one embodiment of the invention.

Referring back to FIG. 3, in step 155, pseudo-frame controller 204 sets the motion vectors of the pseudo B-frame to point to the nearest temporal reference frame. Step 155 is only performed for the pseudo B-frame because a pseudo-frame only has one reference frame whereas a B-frame has two reference frames. Thus, the pseudo B-frame must select one of the two reference frames of the B-frame being coded and the nearest temporal reference frame probably creates the least degradation in video quality. For example, as shown in FIG. 4, a B-frame B5 encoded as a pseudo B-frame would have motion vectors pointing to P-frame P1 instead of P-frame P2 because P-frame P1 is the nearest temporal reference frame. Step 155 is followed by step 156.

In step 156, rate controller 38A monitors the fullness of the VBV buffer to prevent decoder input buffer overflow. Rate controller 38A must inform pseudo-frame controller 204 if the VBV buffer is about to overflow. If the VBV buffer is about to overflow, then step 156 is followed by step 158. Otherwise step 156 is followed by step 152 and method 150 loops as described above.

In step 158, pseudo-frame controller 204 instructs VLC 34A to add stuffing bits before the pseudo-frame in the bit stream. Pseudo-frame controller 204 also recalculates a parameter vbv_delay stored in the frame header of the compliant bit stream. Parameter vbv_delay defines the delay between storing a frame start code in the VBV buffer and starting the decoding of that frame. In one embodiment, the number of stuffing bits added is calculated as follows:

$$\text{stuffing\_bits\_num} = (\text{vbv\_delay} - \text{vbv\_up\_bound}) \times \frac{\text{bit\_rate}}{90000.0}, \quad (1)$$

where parameter stuffing_bits_number is the number of stuffing bits added, parameter vbv_up_bound is the maximum allowable value of vbv_delay, and parameter bit_rate is the channel data rate. In one embodiment, the vbv_delay is recalculated as follows:

$$\text{vbv\_delay} = \text{vbv\_delay} - \frac{\text{stuffing\_bits\_num} \times 90000.0}{\text{bit\_rate}}. \quad (2)$$

Step 158 is followed by step 152 and method 150 loops as described above.

Various other adaptations and combinations of features of the embodiments disclosed are within the scope of the invention. Although various functions are performed by dedicated coders, their functions can be combined into a single hardware or implemented by a combination of hardware and software. For example, pseudo-frame controller 204 and rate controller 38A can be combined into an ASIC (application specific integrated circuit) or a combination of a processor and software stored in memory. Numerous embodiments are encompassed by the following claims.

What is claimed is:

1. A method for encoding a video, comprising:
    buffering frames of the video in an encoder input buffer;
    retrieving the frames from the encoder input buffer;
    encoding the retrieved frames into a bit stream;
    monitoring the encoder input buffer for buffer overflow; and
    when the encoder input buffer is about to overflow, encoding one of the retrieved frames as a pseudo-frame that completely references one reference frame of said one of the retrieved frames, said encoding one of the retrieved frames as a pseudo-frame comprising setting transform coefficients, motion vectors, and coded block patterns of said one of the retrieved frames to zeroes.

2. The method of claim 1, wherein said encoding the retrieved frames into a bit stream comprises:
    performing temporal coding to the retrieved frames to generate motion vectors and residual blocks;
    performing spatial coding to the residual blocks to generate transform coefficients and coded block patterns; and
    performing a variable-length coding to the motion vectors, the transform coefficients, and the coded block patterns to generate the bit stream.

3. The method of claim 2, wherein said one of the retrieved frames is a predicated frame (P-frame) or a bidirectional frame (B-frame).

4. The method of claim 3, wherein said encoding one of the retrieved frames as a pseudo-frame further comprises bypassing the temporal coding and the spatial coding for said one of the retrieved frames.

5. The method of claim 1, further comprising:
    monitoring a hypothetical decoder input buffer for buffer underflow; and
    when the hypothetical decoder input buffer is about to underflow, performing said encoding one of the retrieved frames with as a pseudo-frame.

6. The method of claim 5, wherein said encoding the retrieved frames into a bit stream comprises:
    performing temporal coding to the retrieved frames to generate motion vectors and residual blocks;
    performing spatial coding to the residual blocks to generate transform coefficients and coded block patterns; and
    performing a variable-length coding to the motion vectors, the transform coefficients, and the coded block patterns to generate the bit stream.

7. The method of claim 6, wherein said one of the retrieved frames is a predicated frame (P-frame) or a bidirectional frame (B-frame).

8. The method of claim 7, wherein said encoding one of the retrieved frames as a pseudo-frame further comprises bypassing the temporal coding and the spatial coding for said one of the retrieved frames.

9. The method of claim 1, further comprising:
    monitoring a hypothetical decoder input buffer for buffer overflow; and when the hypothetical decoder input buffer is about to overflow, adding stuffing bits before the pseudo-frame in the bit stream.

10. The method of claim 9, wherein a number of the stuffing bits added before the pseudo-frame in the bit stream is calculated as follows:

$$\text{stuffing\_bits\_num} = (\text{vbv\_delay} - \text{vbv\_up\_bound}) \times \frac{\text{bit\_rate}}{90000.0},$$

wherein a parameter stuffing_bits_num is the number of the stuffing bits added, a parameter vbv_up_bound is a maximum allowable value of a parameter vbv_delay, the parameter vbv_delay is a delay between storing a pseudo-frame staff code in the hypothetical decoder input buffer and staffing the decoding of the pseudo-frame, and a parameter bit_rate is a channel data rate.

11. The method of claim 10, further comprising, when the hypothetical decoder input buffer is about to overflow, recalculating the parameter vbv_delay as follows:

$$\text{vbv\_delay} = \text{vbv\_delay} - \frac{\text{stuffing\_bits\_num} \times 90000.0}{\text{bit\_rate}}.$$

12. The method of claim 11, wherein the hypothetical decoder input buffer is a video buffer verifier (VBV) buffer.

13. A video encoder, comprising:
an encoder input buffer for storing frames of a video;
a temporal coder for reducing temporal redundancies of the frames, the temporal coder generating motion vectors;
a spatial coder for reducing spatial redundancies of the frames, the spatial coder generating transform coefficients and coded block patterns;
a variable-length coder, the variable-length coder generating a bit stream from the motion vectors, the transform coefficients, and the coded block patterns;
a controller being coupled to the encoder input buffer, the temporal coder, the spatial coder, and the variable-length coder;
wherein the controller monitors the encoder input buffer and instructs the temporal coder and the spatial coder to encode one of the retrieved frames as a pseudo-frame that completely references one reference frame of said one of the retrieved frames by setting motion vectors, transform coefficients, and coded block patterns of said one of the retrieved frames to zeroes when the encoder input buffer is about to overflow.

14. The video encoder of claim 13, wherein said one of the retrieved frames is a predicated frame (P-frame) or a bidirectional frame (B-frame).

15. The video encoder of claim 14, wherein the controller further instructs the temporal coder and the spatial coder to bypass coding of said one of the retrieved frames.

16. The video encoder of claim 13, wherein the controller monitors a hypothetical encoder input buffer, the controller also performing said instructing when the hypothetical decoder input buffer is about to underflow.

17. The video encoder of claim 16, wherein said one of the retrieved frames is a predicated frame (P-frame) or a bidirectional frame (B-frame).

18. The video encoder of claim 17, wherein the controller further instructs the temporal coder and the spatial coder to bypass coding of said one of the retrieved frames.

19. The video encoder of claim 13, wherein the controller monitors a hypothetical decoder input buffer for buffer overflow and adds stuffing bits before the pseudo-frame in the bit stream when the hypothetical decoder input buffer is about to overflow.

20. The video encoder of claim 19, wherein a number of the stuffing bits added before the pseudo-frame in the bit stream is calculated as follows:

$$\text{stuffing\_bits\_num} = (\text{vbv\_delay} - \text{vbv\_up\_bound}) \times \frac{\text{bit\_rate}}{90000.0},$$

wherein a parameter stuffing_bits_num is the number of the stuffing bits added, a parameter bit_rate is a channel data rate, a parameter vbv_up_bound is a maximum allowable value of a parameter vbv_delay, a parameter vbv_delay is a delay between storing a pseudo-frame start code in the hypothetical decoder input buffer and starting the decoding of the pseudo-frame, wherein the parameter vbv_delay is calculated as follows:

$$\text{vbv\_delay} = \text{vbv\_delay} - \frac{\text{stuffing\_bits\_num} \times 90000.0}{\text{bit\_rate}}.$$

21. The video encoder of claim 20, wherein the hypothetical decoder input buffer is a video buffer verifier (VBV) buffer.

* * * * *

UNITED STATES PATENT AND TRADEMARK OFFICE
CERTIFICATE OF CORRECTION

| | | |
|---|---|---|
| PATENT NO. | : 7,428,339 B2 | Page 1 of 1 |
| APPLICATION NO. | : 10/703847 | |
| DATED | : September 23, 2008 | |
| INVENTOR(S) | : Xingguo Wang, Guobin Chen and Lingxiang Zhou | |

It is certified that error appears in the above-identified patent and that said Letters Patent is hereby corrected as shown below:

Column 6, line 55, claim 10: Cancel "staff code" and substitute --start code--.

Column 6, line 55, claim 10: Cancel "and staffing" and substitute --and starting--.

Signed and Sealed this

Fifth Day of May, 2009

JOHN DOLL
*Acting Director of the United States Patent and Trademark Office*